Patented Sept. 18, 1923.

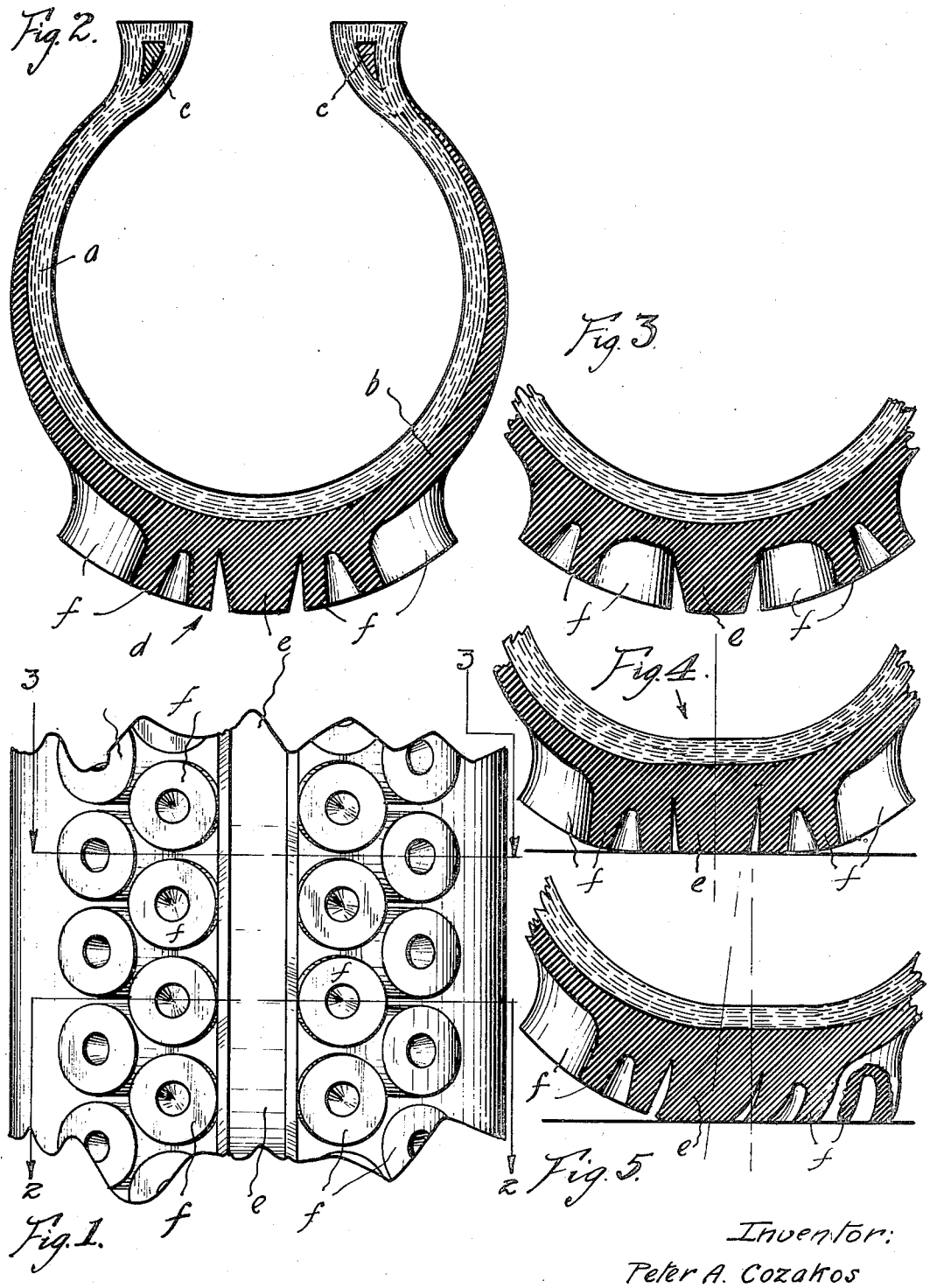

1,468,439

UNITED STATES PATENT OFFICE.

PETER A. COZAKOS, OF PORTLAND, OREGON.

NONSKID TIRE FOR VEHICLE WHEELS.

Application filed February 27, 1922. Serial No. 539,623.

*To all whom it may concern:*

Be it known that I, PETER A. COZAKOS, a citizen of the United States, and a resident of Portland, county of Multnomah, and State of Oregon, have invented a certain new and useful Improvement in Nonskid Tires for Vehicle Wheels, of which the following is a specification.

The object of my invention is to provide a tread for automobile tires which is durable and which normally does not present wide bearing surfaces to the road, but which presents a superior tractive surface when the brakes are set or the car skids.

The tire that seemingly presents the maximum wearing surface to the road and retards the motion of the car least is one in which the tread is composed of narrow parallel longitudinal ribs running around the circumference which are separated by grooves. These tires, when inflated to the proper measure, present very little bearing surface to the ground, and thus retard the forward motion of the car relatively little. These tires do not present sufficient traction on the road and therefore resist skidding very little. They partially prevent side skidding because the grooves between the parallel circumferential ribs grip the ground slightly. They do not prevent in the least, however, skidding with the direction of motion of the car.

The tires which seemingly give the maximum traction are those in which the tread is made up of a plurality of suction cup surfaces spaced across the entire width of the tread. They produce a relatively large retardation factor, however, the force necessary to breaking the suction grip prevents forward motion of the car. The wall of the suction cups also are of a necessity very thin so as to be easily compressed and therefore do not wear well. In my improved tire I have provided a tire on which the weight of the car is normally held by a longitudinal rib of sufficient width and thickness. On a smooth pavement also the cups exert no traction as one edge of the inner rows of cups is lifted and therefore has no suction grip on the road. Any side swerve will tend to throw the rows of cups on the side in the direction of the swerve, into suction grip with the road.

It is to be noted that due to the convex surface of the tire this suction grip will be effective as long as any tread is left on the tire as the bottom of the suction cups on the outside row are practically on a level with the fabric at the center.

I have found it preferable to stagger the separate suction cups in relation to each other so as to present a more uniform suction effect on the surface of the road.

In my improved tire I have combined the lack of frictional resistance of the longitudinally ribbed tire and the maximum safety of the vacuum cup tire. The manner in which I combine these two characteristics I have shown in the accompanying drawings in which:

Fig. 1 is a fragmentary view of the tread of an automobile tire;

Fig. 2 is a cross sectional view taken on the line 2—2 of Fig. 1;

Fig. 3 is a fragmentary cross sectional view taken on the line 3—3 of Fig. 1;

Fig. 4 is a fragmentary cross sectional view taken on the line 2—2 of Fig. 1 and indicates the compression in the tire when a normal load is carried by the tire; and Fig. 5 is a similar cross sectional view with the outside cup broken away to show how the cups grip the pavement when the car skids sideways.

My improved tire is made up of the fabric structure $a$ and the rubber outer surface $b$ and beads $c$. Upon this rubber outer surface $b$ and formed integral with it is the tread $d$. In my improved tire the tread consists of a central rib $e$ and suction cups $f$. As can be noted in Fig. 4 the load of the car is carried almost entirely by the central rib $e$ and until the central rib $e$ is worn substantially the vacuum cups $f$ do not grip the surface perceptibly under ordinary conditions. This insures a minimum loss of power due to frictional retardation of the tires with the road.

As is well recognized any sudden acceleration or deceleration of the motion of the car causes a torque around the horizontal axis, the acceleration causing more pressure to be applied to the wheels under the front end of the car and the deceleration to the ones under the rear end of the car. Thus when the brakes are applied to the rear wheels there is considerably more than normal of a downward pressure applied also and thus this presure will cause the rows of vacuum cups adjacent the central rib to grip the pavement.

Side skidding of the car causes the tire to be twisted slightly about the rim and distorted as shown in Fig. 5. If the car was skidding towards the right the tire would assume approximately the shape shown in Fig. 5 and the two right hand cups would engage with the road surface. On the other hand, if the car skidded oppositely the two opposite rows of vacuum cups would engage with the pavement. Thus it can be seen that this tire normally rides on a very narrow surface but automatically presents the necessary grip to the pavement when the occasion demands.

I claim:

A non-skid tire of resilient material provided with a central circumferential rib and with two rows of suction cups on each side of said rib, the walls of said cups projecting a substantial distance radially beyond the tread portion of the tire, the bearing faces of those rows of suction cups directly adjacent the rib touching substantially the same horizontal plane as the rib when the tire carries the load, and the rows of suction cups farthest from said rib being inclined angularly to, but spaced from said plane, whereby said rib and that portion of the rows of suction cups directly adjacent thereto, normally, support the weight of the vehicle, while the mouths of the other rows of suction cups are spaced from the ground, but any sidewise movement of the tire on the ground tends to distort said rib and that row of suction cups directly adjacent thereto on the side towards which said sidewise movement is directed, and thus brings the outer rows of suction cups on the same side to bear with suction force on the ground.

PETER A. COZAKOS.